United States Patent [19]

Tubbs et al.

[11] Patent Number: 5,752,071
[45] Date of Patent: May 12, 1998

[54] FUNCTION COPROCESSOR

[75] Inventors: Graham S. Tubbs, Ahwatukee; James Charles Abel, Phoenix, both of Ariz.

[73] Assignee: Intel Corporation, Santa Clara, Calif.

[21] Appl. No.: 503,251

[22] Filed: Jul. 17, 1995

[51] Int. Cl.$^6$ .................................................. G06F 15/16
[52] U.S. Cl. ............................ 395/800.34; 395/800.35
[58] Field of Search .................... 395/800, 800.34, 395/800.35, 800.22

[56] References Cited

U.S. PATENT DOCUMENTS

| | | | |
|---|---|---|---|
| H1291 | 2/1994 | Hinton | 395/800 |
| 4,338,675 | 7/1982 | Palmer et al. | 364/748.16 |
| 5,187,796 | 2/1993 | Wang | 395/800 |
| 5,203,002 | 4/1993 | Wetzel | 395/800 |
| 5,212,777 | 5/1993 | Gove | 395/375 |
| 5,325,490 | 6/1994 | Brasseur | 395/309 |
| 5,357,614 | 10/1994 | Pattisam | 395/250 |
| 5,361,370 | 11/1994 | Sprague et al. | 395/800.22 |
| 5,471,593 | 11/1995 | Branigin | 395/375 |
| 5,530,889 | 6/1996 | Kametani | 395/800 |

OTHER PUBLICATIONS

Bennett, Gregg, "DSPs advance low–cost 'green' control", *Electronic Engineering Times*, 17 Apr. 1995, Issue 844, pp. 58 & 60.

Berger, Shaul, "DSP seen as enabling technology for PCS", *Electronic Engineering Times*, 17 Apr. 1995, Issue 844, p. 56.

Bindra, Ashok, "Benchmarks due defining NSP/DSP balance", *Electronic Engineering Times*, 17 Apr. 1995, Issue 844, pp. 48 & 72.

Blouet, Patrick, "DSP shifts to perform for the consumer", *Electronic Engineering Times*, 17 Apr. 1995, Issue 844, pp. 70–71.

Cole, Bernard C., "Embedded Systems", *Electronic Engineering Times*, 17 Apr. 1995, Issue 844, pp. 46,73–74,78, 80,82,84,86.

Fahy, Randall, "Making DSP the core of wireless systems", *Electronic Engineering Times*, 17 Apr. 1995, Issue 844, pp. 49 & 52.

Frankel, Bob, "DSPs find real–time embedded use", *Electronic Engineering Times*, 17 Apr. 1995, Issue 844, pp. 68–69.

Slater, Michael, "Micro Scene: Embedded's shifting sands", *Electronic Engineering Times*, 17 Apr. 1995, Issue 844, p. 46.

"Intel387 DX Math CoProcessor (Mar. 1992)", *Microprocessors: vol. 1 (1994)*, Chapter 1, pp. 1–163—1–202.

"Intel 8087 Math CoProcessor (Oct. 1989)", *Microprocessors: vol. 1 (1994)*, Chapter 3, pp. 3–90—3–111.

*Primary Examiner*—Eric Coleman
*Attorney, Agent, or Firm*—Blakely, Sokoloff, Taylor & Zafman

[57] ABSTRACT

A function coprocessor for a processor having a first type of coprocessor interface is described. The function coprocessor includes a subprocessor and program memory coupled to the subprocessor. A data memory stores data from the processor in response to a first control signal. The data memory has m ports coupled to the subprocessor for providing up to m operands to the subprocessor per clock cycle. The function coprocessor also includes a function coprocessor interface compatible with the first type of coprocessor interface for coupling to the processor. The function coprocessor interface generates the first control signal in response to interface signals received from the coprocessor interface of the processor. The function coprocessor interface provides handshake signals to the coprocessor interface of the processor including a busy signal, an error signal, and a processor extension request signal.

15 Claims, 4 Drawing Sheets

FUNCTION COPROCESSOR

FIELD OF THE INVENTION

This invention pertains to the field of computer architectures. In particular, this invention pertains to a function coprocessor for use in conjunction with a general purpose processor.

BACKGROUND OF THE INVENTION

Digital signal processing (DSP) is becoming prevalent in the microcomputer industry. The development of multimedia applications which require audio and video processing places greater information processing demands on microcomputer systems. Digital signal processing algorithms have found uses in communications, control, audio, and image processing. Digital signal processing is increasingly finding uses in embedded applications such as in the telecommunications industry. Telephonic, network, wireless, and facsimile communications are examples of telecommunications applications posing an increasing need for embedded digital signal processing.

DSP is primarily concerned with performing mathematical functions on array-based data. Prior art methods for accomplishing mathematical functions on array-based data include (1) using only a host processor, or (2) using a coprocessor in conjunction with the host processor.

One disadvantage of using only the host processor (e.g., a microprocessor) to perform the computations is that the general purpose microcomputer is not well-suited for performing the math functions in addition to system control functions. The general purpose processor typically does not support common DSP addressing modes such as a circular addressing mode. A general purpose microprocessor may not even support common DSP processor features such as arithmetic logic unit (ALU) saturation. Instead of "saturating" at the maximum or minimum numerical result that the processor can represent, a general purpose processor typically continues accumulating results in a register after issuing an overflow exception. Because the registers have a finite bit width, the result is that the general purpose processor "wraps around" the number system.

Another disadvantage of using only the microprocessor is that the microprocessor is not designed for performing array operations as well as a DSP processor. General purpose microprocessor architectures do not permit fetching multiple operands per memory access. For array-type functions the microprocessor completes a computation by serially performing a scalar operation on each element of the array. Performing complex scalar mathematical functions can substantially impact the performance of the microcomputer-based system.

In order to reduce the impact on performance, a coprocessor might be used to offload some of the processing from the microprocessor. In particular, numeric processors and digital signal processors have been used in conjunction with a microprocessor in order to enhance system performance when performing DSP algorithms.

Numeric coprocessors are designed to reduce the burden on a microprocessor for executing scalar math functions. Using a numeric coprocessor in conjunction with a microprocessor generally improves system performance with respect to mathematical computations. Examples of prior art numeric coprocessors include the 8087, 80287, and 80387DX numeric coprocessors manufactured by Intel Corporation of Santa Clara, Calif. These prior art numeric (or math) coprocessors are specifically designed to process computations at a greater rate than what a general purpose microprocessor (e.g., their counterpart host processors, the Intel 8086, 80286, and 80386DX microprocessors, respectively) can process because the computational functionality is implemented in hardware as opposed to software. As fabrication technology evolved, the numeric coprocessor has been incorporated into ("on-board") the microprocessor itself. Intel's 80486DX and Pentium™ processors are examples of microprocessors with on-board math coprocessors.

Prior art numeric coprocessors such as the Intel 80387DX numeric coprocessor are tightly integrated with the host microprocessor. This tight integration is accomplished through the use of a coprocessor interface. The host microprocessor fetches instructions intended for the host microprocessor and the coprocessor. In one prior art architecture, instructions intended for the coprocessor are coded as "escape" instructions. Whenever the microprocessor encounters an escape instruction, it automatically passes the contents of the instruction to the numeric coprocessor using the coprocessor interface.

One disadvantage of the prior art numeric coprocessor is that it has a fixed functionality whether located external to or incorporated in the microprocessor itself. In other words, the library of mathematical functions that can be performed by the prior art numeric coprocessor can not be altered after manufacture of the coprocessor. The prior art numeric coprocessor cannot be loaded or programmed with a new function such as a new filtration algorithm for use by application programs executing on the microprocessor. Thus the prior art numeric coprocessor has a static library of functions.

Another disadvantage of the prior art numeric coprocessor is that it is not scalable. In other words, the prior art numeric coprocessors can not process more than one math operation at a time.

The prior art numeric coprocessor typically requires the microprocessor to perform all data transfers to and from the coprocessor. The data transfer can be a burden on the microprocessor because the prior art coprocessor functions are often simple and only operate on a single data element at a time as opposed to an array of data.

In contrast, a digital signal processing processor has an architecture suitable for fast execution of signal processing algorithms. A common function in many signal processing algorithms is the summation of multiple products. In contrast with general purpose microprocessors, DSP processors have high-speed multiplier/accumulators for performing the summation of multiple products. Another distinction is that DSP processors often have multiple data busses and memories. Many DSP processors have two data memories, each with a data bus, to permit the simultaneous fetch of two operands for the multiply-accumulate operation. Finally DSP processors typically have separate arithmetic-logic units (ALU) for data arithmetic and address calculations. This permits data calculations to proceed unhindered by address calculations.

Prior art DSP circuits are often programmable such that different functions can be loaded in contrast with the fixed functionality of the prior art numeric coprocessor. For example, DSP processors can be programmed to efficiently handle fast Fourier transform (FFT) and other computations typically required in DSP applications. The DSP processor tends to be designed to permit processing of arrays of data as opposed to the singular data item as was the case with the prior art math coprocessor.

One disadvantage of the prior art microprocessor and DSP coprocessor combination is that the DSP coprocessor often uses an entirely different operating system. In contrast to the tight integration of prior art numeric coprocessors, communication between the prior art DSP coprocessor and the microprocessor is "loose." Glue logic and specific protocols are required to communicate with the DSP processor. Typically a "mailbox" messaging system is used where the host processor places and retrieve information from a mailbox register in the DSP coprocessor using input/output control functions such as IN and OUT. From a software viewpoint, instructions intended for the DSP coprocessor are coded as data within the software executing in the host processor. As data instead of instruction the information is more difficult to debug and validate from a software development standpoint.

Another disadvantage of the prior art combination is that the microprocessor and the DSP processor use different programming models. The use of different programming models tends to make system software development more difficult.

SUMMARY OF THE INVENTION

A function coprocessor for a processor having a first type of coprocessor interface is described. The function coprocessor includes a subprocessor and program memory coupled to the subprocessor. A data memory stores data from the processor in response to a first control signal. The data memory has m ports coupled to the subprocessor for providing up to m operands to the subprocessor per clock cycle. The function coprocessor also includes a function coprocessor interface compatible with the first type of coprocessor interface for coupling to the processor. The function coprocessor interface generates the first control signal in response to interface signals received from the coprocessor interface of the processor. The function coprocessor interface provides handshake signals to the coprocessor interface of the processor including a busy signal, an error signal, and a processor extension request signal.

A computer architecture is also described. The computer architecture includes a processor having a first type of coprocessor interface and a function coprocessor. The function coprocessor includes a subprocessor and a program memory coupled to the subprocessor. Data from the processor is stored in a first data memory in response to a first control signal. The first data memory has m ports coupled to the subprocessor for providing up to m operands to the subprocessor per clock cycle. The function coprocessor also includes a function coprocessor interface compatible with the first type of coprocessor interface for coupling to the processor. The function coprocessor interface generates the first control signal in response to interface signals received from the coprocessor interface of the processor. The function coprocessor interface providing handshake signals to the coprocessor interface of the processor including a busy signal, an error signal, and a processor extension request signal.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
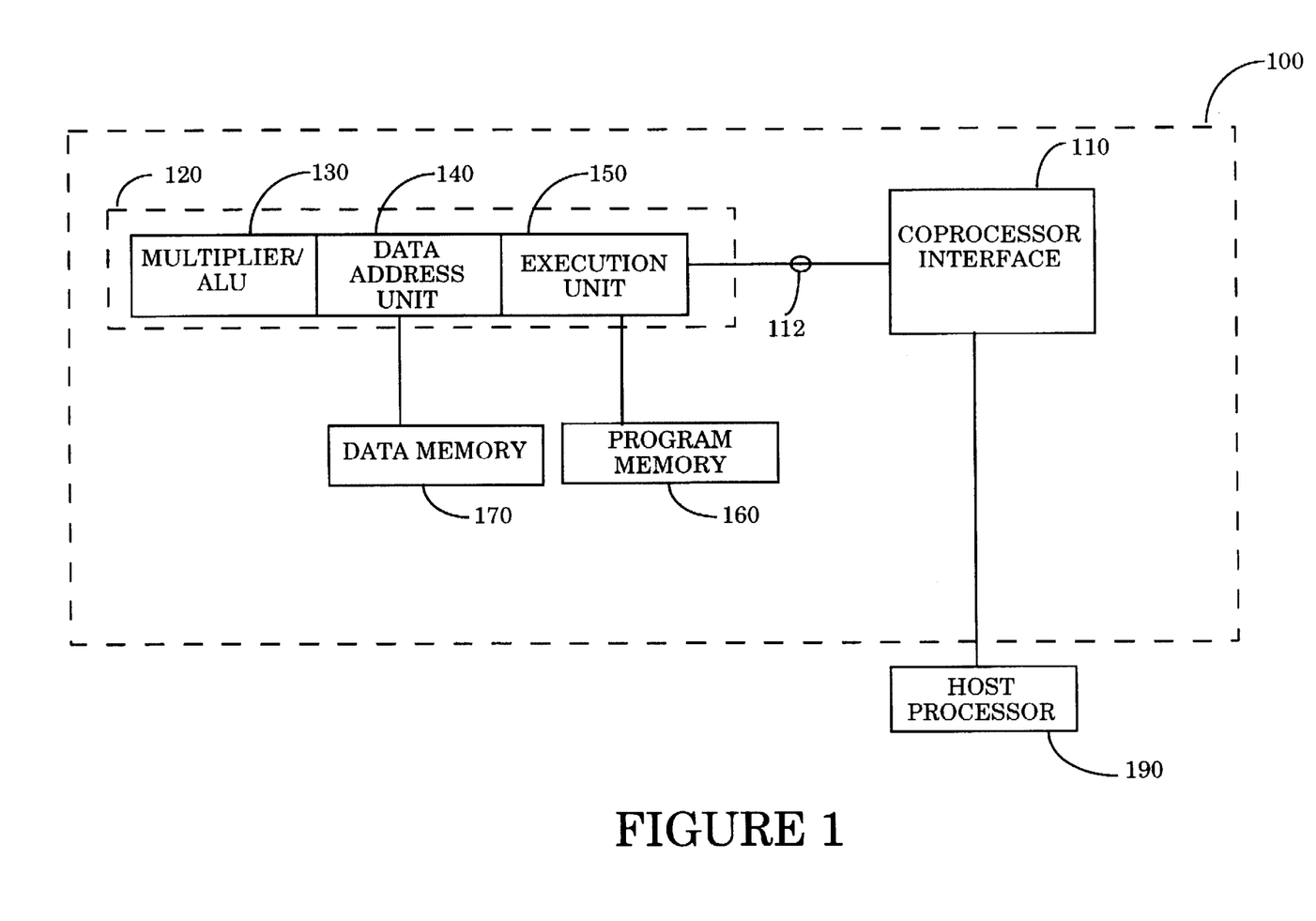
FIG. 1 illustrates a single instruction multiple data function coprocessor.

FIG. 1 illustrates a programmable function coprocessor for performing DSP algorithms in conjunction with a host processor (e.g., a microprocessor). The function coprocessor includes a DSP processor core and a coprocessor interface.

Function coprocessor 100 is a programmable coprocessor for performing complex mathematical functions. Function coprocessor 100 can execute relatively complex math operations independently of and concurrently with processor 190. This permits processor 190 to prepare for the next function or to execute other code (i.e., switch to another task) while the function coprocessor completes a requested computation. For computation-intensive functions the function coprocessor 100 interrupts processor 190 so the processor can continue with the task requesting the computation.

The architecture, instruction set, and addressing modes of the function coprocessor are oriented to complex math functions, and the function coprocessor executes these functions much faster than the processor alone. These math functions are programmable, so function coprocessor 100 can be programmed for use in a multitude of applications. Programming and control of the function coprocessor is accomplished using a processor-compatible interface between processor 190 and function coprocessor 100.

Processor 190 has a predetermined coprocessor interface. In one embodiment processor 190 is an Intel x86 compatible microprocessor having an Intel x86 compatible numeric coprocessor interface. Function coprocessor 100 communicates with processor 190 using coprocessor interface 110 of the function coprocessor. Coprocessor interface 110 is compatible with the numeric coprocessor interface of the host processor 190.

In one embodiment, function coprocessor 100 is a Harvard architecture coprocessor. In other words, function coprocessor 100 uses separate data memory 170 and program memory 160. Program memory 160 stores program instructions to be executed by subprocessor 120. Subprocessor 120 uses data memory 170 for storing input data for the mathematical functions as well as output (result) data.

Subprocessor 120 includes multiplier/arithmetic logic unit 130, data addressing unit 140, and execution unit 150. Execution unit 150 in conjunction with multiplier/arithmetic logic unit 130 executes program instructions stored in program memory 160. Program memory 160 can be read only memory, random access memory, or some combination of the two. A read only memory might be preferable in some fixed function embedded applications. In one embodiment, subprocessor 120 includes hardware multipliers and shifters to speed execution.

Multiplier/algorithmic logic unit 130 (hereinafter "multiplier/ALU") might include a single cycle multiplication and resultant accumulator to speed execution. Because only one execution unit is present, subprocessor 120 is a single instruction subprocessor. With a single multiplier/ALU, subprocessor 120 is a single instruction single data (SISD) processor. The SISD processor can fetch one or more operands for each access to data memory 170. Whether the SISD processor requires multiple fetches or only a single fetch to retrieve all operands required for a single operation, the SISD processor is still termed a single data processor. In one embodiment, function coprocessor 100 is an SISD coprocessor.

Alternatively, in another embodiment, function coprocessor 100 includes a plurality of multiplier/ALUs 130 for a single execution unit 150.

This permits subprocessor 120 to be a single instruction multiple data (SIMD) processor. The SIMD processor typically fetches one or more operands for all of the multiplier/ALUs with each access to data memory 170. Data for the operation is typically already aligned in the data memory such that the operands are in logically contiguous data memory locations. If addressing can be accomplished at a finer granularity than the size of the data, "consecutive data locations" means consecutive address boundaries to which operands can be aligned. For example, assume each addressable memory location represents one word of data memory and the first operand is located at address n. If each operand require two words of data memory, then the next operand is located at address n+2. This second address is considered to be logically consecutive to the first address because it is the next location at which an operand can be stored.

As an example of SIMD processing assume there are four multiplier/ALUs, numbered one through four, and each is to perform a multiply instruction (requiring two operands). Four consecutive data locations represent four operands, one for each multiplier/accumulator. The next four locations (for a total of eight) represent four more operands, one for each multiplier/ALU. The first and the fifth locations represent operands associated with the first multiplier/ALU. Similarly, the second and the sixth locations represent operands associated with the second multiplier/ALU, and so on for all four multiplier/ALUs. The SIMD processor might fetch four operands, one for each multiplier/ALU, for each access to data memory 170. Alternatively, the SIMD processor in this example might fetch all eight operands, two for each multiplier/ALU, with one access to data memory 170. Whether the SIMD processor performs a single fetch or multiple fetches to retrieve all the operands required for an instruction, the SIMD processor is still termed a multiple data processor because it can provide data to more than one multiplier/ALU with each fetch operation. In one embodiment, function coprocessor 100 is an SIMD coprocessor.

In an alternative embodiment, a multiplier is used instead of multiplier/ALU 130. In other words, no arithmetic logic unit is present.

Data addressing unit 140 reads and stores data in data memory 170 in response to the executed program instructions. Data addressing unit 140 supports addressing modes typically found in DSP applications including modulus addressing and increment-by-n addressing. The function coprocessor manages much of its data using data addressing unit 140. This is contrasted with passing entire arrays between the processor and the function coprocessor using the coprocessor interface. In one embodiment data memory 170 is random access memory. In another embodiment data memory 170 includes random access memory and read only memory.

Internal data memory 170 is at least dual ported to permit retrieving more than one operand per clock cycle. Alternatively, internal data memory 170 is singly ported. Many DSP algorithms, however, work better when reading more than one operand per clock cycle. For example, in preparation for taking the dot product of two vectors stored in data memory 170, data addressing unit 140 can retrieve one element from the first vector and a corresponding element from the second vector in one clock cycle.

In contrast with the prior art numeric coprocessor which required the processor to manage data for the numeric coprocessor, the function coprocessor manages much of its own data using data addressing unit 140.

In one embodiment coprocessor interface 110 is the Intel x87 coprocessor interface. One instantiation of the x87 coprocessor interface is the Intel 80387DX coprocessor interface. The 80387DX coprocessor interface is described at length in *Microprocessors: Volume 1*, Intel Corporation, 1994, pp. 1–163–1–202. The numeric coprocessor interfaces of the host processor and the function coprocessor are collectively, generically referred to as the coprocessor interface. When necessary, however, to identify the aspects particular to the interface circuitry associated with the host processor or the function coprocessor, the circuitry will be identified accordingly. For example, one host numeric coprocessor interface is the Intel 8086 coprocessor interface. An example of the counterpart, non-host coprocessor interface is found in the Intel 8087 numeric coprocessor.

Figure 2:
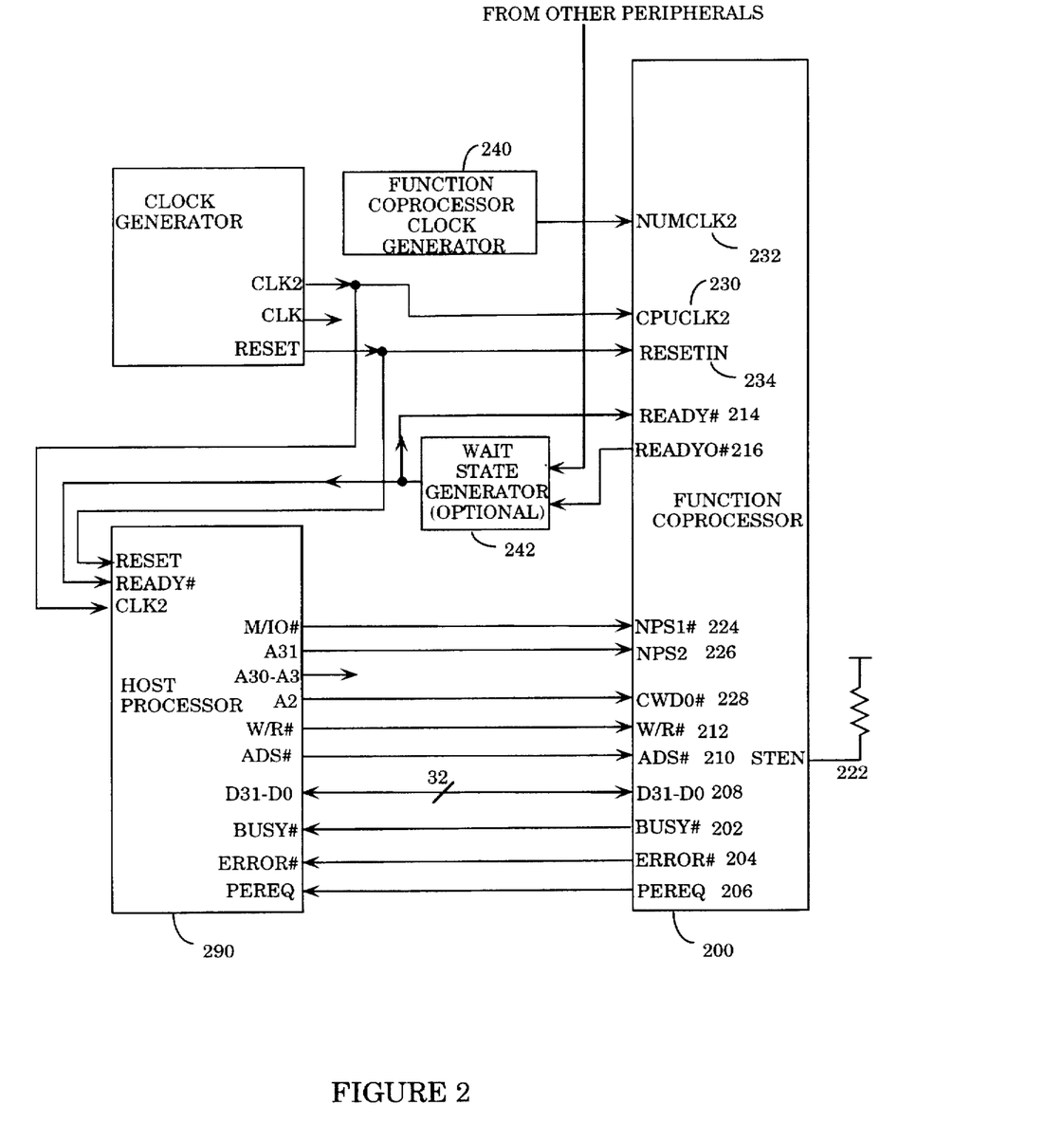
FIG. 2 illustrates signals used by the coprocessor interface.

The coprocessor interface uses a number of interface signal lines for communicating with processor 190. FIG. 2 illustrates the interface signal lines used by the coprocessor interface. These interface signal lines can be grouped by function. These functions include execution control, processor handshake, bus interface, and chip/port select.

The execution control signals are provided by processor 290 to function coprocessor 200. The execution control signal lines include clock and reset signal lines. The function coprocessor must receive a clock signal (CPUCLK2 230) synchronized with the clock signal for the host processor to ensure that the interface logic is synchronous with the host processor. The function coprocessor can operate synchronously with the host processor. For synchronous operation of the interface logic but asynchronous operation of the function coprocessor, the function coprocessor might use an additional clock signal (NUMCLK2 232). The additional clock signal is provided by function coprocessor clock generator 240. In this case the subprocessor would use NUMCLK2 for driving instruction execution. However, if synchronous operation is intended, the function coprocessor clock generator is unnecessary. Clock signal lines 230 and 232 are used by function coprocessor 200 for interfacing externally with processor 290 and for instruction execution by the subprocessor. RESETIN signal line 234 is used to reset function coprocessor 200.

In one embodiment, the processor handshake signals include BUSY# (202), ERROR# (204), and processor extension request (PEREQ 206) signal lines. The "#" symbol indicates that the signal lines are active low. Interaction between the host processor and the coprocessor can be initiated by either device. The host processor initiates function coprocessor operation when the host executes a coprocessor (escape) instruction under program control. The coprocessor initiates interaction by activating the PEREQ signal to request data transferred to and from the data memory.

When the host processor executes an escape instruction requiring the transfer of operands to or from the coprocessor, the host processor automatically sets an internal memory address base register, memory address limit register, and a direction flag. The coprocessor then requests transfers by driving PEREQ active. These requests can occur only when BUSY# is active, indicating the coprocessor is executing an instruction.

BUSY# signal 202 indicates to processor 290 that function coprocessor 200 is currently executing program instructions or other tasks. This helps to prevent a new instruction from unexpectedly overriding the execution of a current coprocessor instruction. In one embodiment a subset of instructions can be transferred to the coprocessor even when the BUSY# signal is active. This permits queuing of certain instructions within the DSP core.

PEREQ signal 206 indicates to processor 290 that function coprocessor 200 is ready to communicate data between the function coprocessor's data memory and processor 290. The PEREQ signal is used both when transferring data from the processor to the function coprocessor and when transferring data from the function coprocessor to the processor. All input and output data transfers are performed by the host processor. In contrast, function coprocessor 200 handles much of its own data input and output transfers using a data addressing unit to access the data memory as illustrated in FIG. 1. However, the PEREQ signal permits transfers using the CPU.

ERROR# signal 204 indicates to processor 290 that function coprocessor 200 has encountered an exception. In one embodiment, ERROR# is asserted after a function coprocessor instruction results in an exception that is not masked by a function coprocessor control register.

The bus interface signals are used to facilitate the exchange of data between the host processor and the numeric coprocessor. The bus interface signals include data lines, a write/read (W/R#) signal, an address strobe (ADS#), a bus ready input (READY#), and a bus ready output (READYO#).

The data bus (data lines 208) is used to transfer data and opcodes between the host processor and the function processor. FIG. 2 illustrates 32 data lines for a 32 bit data bus. The data bus should accommodate the data path provided by the host's coprocessor interface. For example, an Intel 80386SX has a 16 bit data bus as part of its coprocessor interface. In an alternative embodiment the function coprocessor data bus is a 16 bit data bus.

W/R# 212 indicates to the function coprocessor whether the host processor bus cycle in process is a read or a write cycle. This input is ignored if any of the signals STEN, NPS1#, or NPS2 (discussed below) is inactive.

ADS# 210 is an address strobe, which, when used in conjunction with the READY# input indicates when the function coprocessor can examine the W/R# and chip-select signals (NPS1#, NPS2, and STEN).

READY# 214 indicates to the function coprocessor when a host processor bus cycle is to be terminated. Bus cycles can be extended indefinitely until terminated by READY#. READY# 214 is used by bus-control logic to trace bus activities. The READY# input is used in conjunction with the ADS# input to determine when W/R#, NPS1#, NPS2, and STEN can be sampled.

READYO# 216 is activated two clock cycles before a write operation terminates and three clock cycles before a read operation terminates. This signal is activated only during bus cycles that select the function coprocessor. READYO# 216 is provided so that the host processor can acknowledge function coprocessor bus cycles. The functionality of READYO# might be provided by external logic instead. READYO# might be used to drive wait state generator 242 when wait states are necessary. Otherwise this signal is used to drive the processor READY# input 292.

Chip/port select signals include STEN (status enable), NPS1#, NPS2, and CMDO#. STEN 222 serves as a chip select for the function coprocessor. When inactive, STEN forces BUSY#, PEREQ, ERROR#, and READYO# to float. STEN permits the function coprocessor to recognize its other chip-select inputs. STEN can be used to activate one function coprocessor at a time in a system with multiple function coprocessors. In one embodiment, STEN is coupled to a power supply such that the function coprocessor always recognizes its other chip-select inputs. In other words, STEN is always active. This might be appropriate in a single function coprocessor system.

NPS1# 224 indicates to the function coprocessor that the purpose of the bus cycle is to communicate with the function coprocessor. NPS1# is connected to the host processor M/IO# output.

NPS2 226 also indicates to the function coprocessor that the purpose of the bus cycle is to communicate with the function coprocessor. NPS2 is coupled to the host processor address line A23. In alternative embodiments, other addresses might be used to communicate with the function coprocessor. In such a case, NPS2 would be coupled to the appropriate address signal lines.

CMDO# 228 is used during a write cycle to indicate whether an opcode or data is being sent to the function coprocessor. CMDO# is connected to the host processor address line A2. Data transfers to and from the function coprocessor are accomplished through I/O addresses 8000F8h, 8000FCh, and 8000FEh. The commands are automatically generated by the processor for coprocessor instructions and allow simple chip-select generation using A23 and M/IO#. Because A23 is high for coprocessor cycles, the coprocessor addresses lie outside the range of the programmed input/output (I/O) address space and are easy to distinguish from programmed I/O addresses. The host processor outputs address 8000F8h when writing a command or reading a status. (The "h" suffix indicating a hexadecimal address.) The host processor outputs address 8000FCh when writing data. The host processor outputs 8000FEh when reading data. In alternative embodiments, another address might be used to communicate with the function coprocessor. In such a case, the chip-select generation signals would be based on the appropriate address signal lines.

Using the coprocessor interface controls as outlined above permits the function coprocessor to be "tightly" integrated with the host processor. Instructions intended for the function coprocessor can be passed using escape instructions. This tight coupling helps to reduce complexity introduced by the use of a separate operating system and specialized protocols with the prior art DSP processor.

In one embodiment, the function coprocessor is in a separate integrated circuit package from the processor. In an alternative embodiment, the function coprocessor is in the same integrated circuit package as the processor. In this alternative embodiment, the "chip select" signals are more properly referred to as "module select" signals because the function coprocessor is a module within the same chip or integrated circuit package as the processor.

Figure 3:
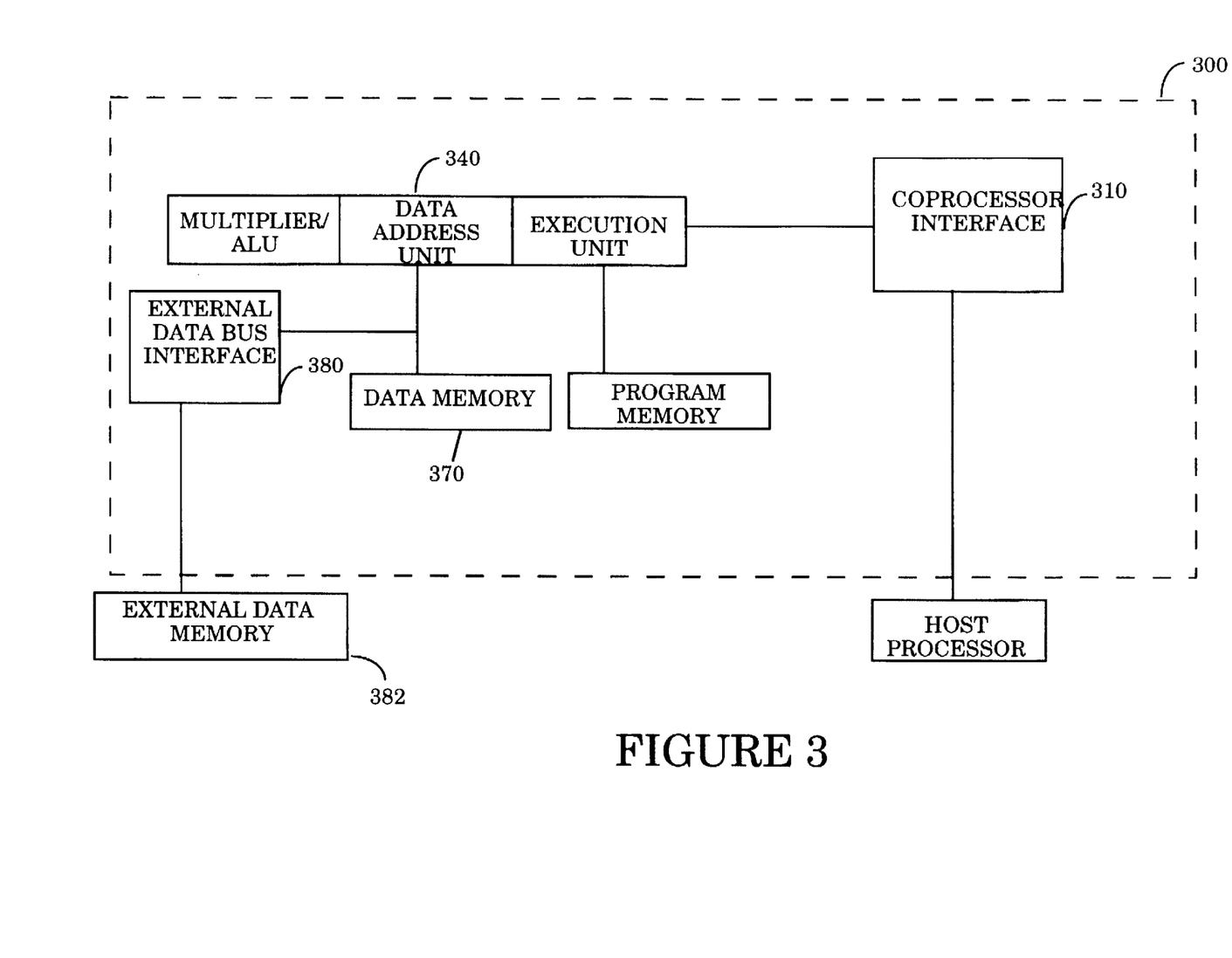
FIG. 3 illustrates a single instruction multiple data function coprocessor with access to external data memory.

FIG. 3 illustrates an alternative embodiment of the function coprocessor. External data bus interface unit 380 permits data address unit 340 access to external data memory 382. Internal data memory 370 is ported to permit access by data addressing unit 340.

In one embodiment, external data memory 382 is a low-cost static random access memory for algorithms that require more data than is cost-effective to place on the coprocessor die.

Figure 4:
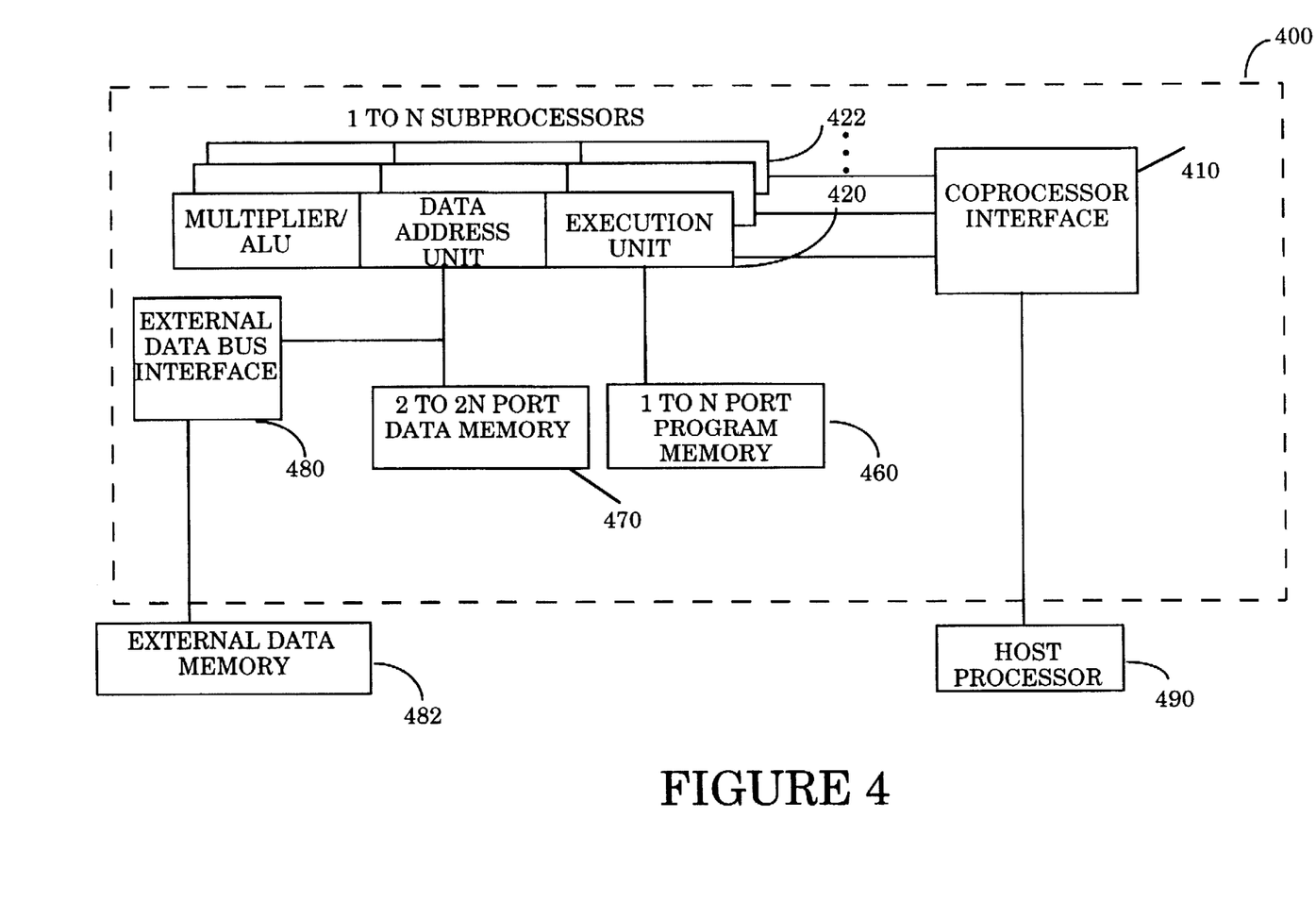
FIG. 4 illustrates a multiple instruction multiple data function coprocessor.

FIG. 4 illustrates n-scaled function coprocessor 400. The n-scaled function coprocessor includes n subprocessors 420–422. Program memory 460 is an n-ported memory to permit access by each of the n subprocessors. Data memory 470 is at least an 2•n-ported memory to permit access by the data addressing unit of each of the n subprocessors. This permits the data addressing units of each subprocessor to access data memory 470 to retrieve up to two operands per clock cycle.

In another embodiment data memory 470 is n ported such that one operand per clock cycle can be retrieved by each subprocessor. In alternative embodiments, data memory 470 is y•n-ported where y is an integer representing the maximum number of operands to be extracted per clock cycle and n represents the number of subprocessors in the scaled system.

Coprocessor interface 410 supports scalability of the subprocessors. Using control lines 412, host processor 490 controls the selection, usage, and binding of the available processors, 420–422, through coprocessor interface 410. This permits the function coprocessor to support both single instruction multiple data (SIMD) processing as well as multiple instruction multiple data (MIMD) processing. These modes of processing help to speed array computations.

In single instruction multiple data processing, each subprocessor is executing the same instruction in lock-step synchronism. Each subprocessor, however, is performing the same operation on a different set of data. With MIMD processing, each subprocessor is typically assigned a different set of data to transform. Because each subprocessor of an MIMD system executes its own instruction stream, some synchronization mechanism is necessary to prevent any subprocessor from proceeding until all processors in the system reach a synchronization point. MIMD systems represent a collection of independent processors that synchronize with each other at specific points within each subprocessors instruction stream. These synchronization points are typically controlled by software. In contrast, SIMD systems execute each instruction in synchronization with each other.

Programming for the SIMD model tends to be easier because only one program must be developed and executed. The hardware already handles the lock-step synchronization.

The function coprocessor has significant programming advantages over a prior art general purpose processor and DSP processor combination. The processor participates in the execution of the algorithm, and therefore controls the flow of execution of the function coprocessor. Because the function coprocessor only executes math functions and does not perform control functions; it does not have an operating system; the only operating system executing is on the processor. In comparison to a general purpose processor and DSP processor combination, this helps to reduce system resource requirements (such as a program and data memory) since operating systems tend to consume a considerable amount of memory.

The function coprocessor may have programmable functionality as opposed to the fixed functionality of the prior art math coprocessor. In other words, the library of functions that the coprocessor can perform is dynamic. For example, program development for the function coprocessor is aided by the use of libraries. The function coprocessor can utilize pre-written libraries of common signal processing functions. These libraries are dynamically loaded on the function coprocessor. In other words, the processor performs library management functions either through the application executing on the processor or a separate library management routine. In one embodiment, the application program executing on the processor instructs the function coprocessor to load library functions as needed. In an alternate embodiment, a library management routine will detect that the function requested by the application executing on the processor is not loaded. The library management routine will then instruct the function coprocessor to load the appropriate function.

Functionally-equivalent source code for these libraries could be available for algorithm development on a standard development system such as an Intel architecture-based microcomputer. Taking the program from the Intel architecture-based development environment to a combination system having an Intel architecture-based processor and function coprocessor would require a port, recompile, and link.

Compilers often provide an option to provide code for systems (1) having a numeric processor (2) lacking a numeric coprocessor and object code to support systems with or without a numeric coprocessor. If a system includes a numeric coprocessor and the compiler provided object code to support the coprocessor then coprocessor specific instructions will be executed as "escape instructions" by the microprocessor and passed on to the coprocessor. Similarly, a compiler could provide function coprocessor specific opcodes in the event that the system has a function coprocessor. The object code is executed by the host microprocessor. If a function coprocessor is present the object code will provide function coprocessor-specific "escape instructions" to the microprocessor. The microprocessor will "execute" the escape instruction and pass the instruction to the function coprocessor using the coprocessor interface.

In the preceding detailed description, the invention is described with reference to specific exemplary embodiments thereof. It will, however, be evident that various modifications and changes may be made thereto without departing from the broader spirit and scope of the invention as set forth in the claims. The specification and drawings are, accordingly, to be regarded in an illustrative rather than a restrictive sense.

What is claimed is:

1. A function coprocessor for a processor having a first type of coprocessor interface, comprising:

a subprocessor;

a program memory coupled to the subprocessor;

a first data memory for storing data from the processor in response to a first control signal, the first data memory having m ports coupled to the subprocessor for providing up to m operands to the subprocessor per clock cycle; and a function coprocessor interface compatible with the first type of coprocessor interface for coupling to the processor, the function coprocessor interface generating the first control signal in response to interface signals received from the coprocessor interface of the processor, the function coprocessor interface providing handshake signals to the coprocessor interface of the processor including a busy signal, an error signal, and a processor extension request signal.

2. The function coprocessor of claim 1 further comprising:

a data bus interface for communicating data with a second data memory, the second data memory external to the function coprocessor, the data bus interface coupled to the subprocessor.

3. The function coprocessor of claim 1 wherein the subprocessor further comprises:

an execution unit for executing program instructions;

a data addressing unit for communicating data between the execution unit and the first data memory;

a multiplier coupled to the execution unit.

4. The function coprocessor of claim 3 wherein the execution unit loads program instructions received from the processor into the program memory in response to a load instruction received from the processor.

5. The function coprocessor of claim 1 wherein the program memory includes read only memory.

6. The function coprocessor of claim 1 wherein m is two.

7. A computer architecture comprising:

a processor having a first type of coprocessor interface;

a function coprocessor, comprising:

a subprocessor;

a program memory coupled to the subprocessor;

a first data memory for storing data from the processor in response to a first control signal, the first data memory having m ports coupled to the subprocessor for providing up to m operands to the subprocessor per clock cycle; and a function coprocessor interface compatible with the first type of coprocessor interface for coupling to the processor, the function coprocessor interface generating the first control signal in response to interface signals received from the coprocessor interface of the processor, the function coprocessor interface providing handshake signals to the coprocessor interface of the processor including a busy signal, an error signal, and a processor extension request signal.

8. A function coprocessor for a processor having a first type of coprocessor interface, comprising:

y subprocessors;

a program memory coupled to the subprocessors;

a first data memory for storing data from the processor in response to a first control signal, the first data memory having y•m ports coupled to the subprocessors for providing up to m operands to each subprocessor per clock cycle; and a function coprocessor interface compatible with the first type of coprocessor interface for coupling to the processor, the function coprocessor interface generating the first control signal in response to interface signals received from the coprocessor interface of the processor, the function coprocessor interface providing handshake signals to the coprocessor interface of the processor including a busy signal, an error signal, and a processor extension request signal.

9. The function coprocessor of claim 8 further comprising:

a data bus interface for communicating data with a second data memory, the second data memory external to the function coprocessor, the data bus interface coupled to the subprocessors.

10. The function coprocessor of claim 8 wherein each subprocessor further comprises:

an execution unit for executing the program instructions;

a data addressing unit for communicating data between the execution unit and the first data memory; and a multiplier coupled to the execution unit.

11. The function coprocessor of claim 8 wherein the execution unit loads program instructions received from the processor into the program memory in response to a load instruction received from the processor.

12. The function coprocessor of claim 8 wherein the program memory includes read only memory.

13. The function coprocessor of claim 8 wherein the program memory includes read only memory.

14. The function coprocessor of claim 8 wherein the coprocessor interface of the function coprocessor provides control signals to each of the m subprocessors for selection and binding.

15. A computer architecture comprising:

a processor having a first type of coprocessor interface;

a function coprocessor, comprising:

y subprocessors;

a program memory coupled to the subprocessors;

a first data memory for storing data from the processor in response to a first control signal, the first data memory having y•m ports coupled to the subprocessors for providing up to m operands to each subprocessor per clock cycle; and a function coprocessor interface coupled to the coprocessor interface of the processor, the function coprocessor interface generating the first control signal in response to interface signals received from the coprocessor interface of the processor, the function coprocessor interface providing handshake signals to the coprocessor interface of the processor including a busy signal, an error signal, and a processor extension request signal.

* * * * *